US010135735B2

United States Patent
Yousaf et al.

(10) Patent No.: US 10,135,735 B2
(45) Date of Patent: Nov. 20, 2018

(54) METHOD AND SYSTEM FOR MANAGING FLOWS IN A NETWORK

(71) Applicant: NEC Europe Ltd., Heidelberg (DE)

(72) Inventors: Faqir Zarrar Yousaf, Leimen (DE); Andreas Maeder, Wuerzburg (DE)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 15/325,723

(22) PCT Filed: Jul. 16, 2014

(86) PCT No.: PCT/EP2014/065255
§ 371 (c)(1),
(2) Date: Jan. 12, 2017

(87) PCT Pub. No.: WO2016/008519
PCT Pub. Date: Jan. 21, 2016

(65) Prior Publication Data
US 2017/0149665 A1    May 25, 2017

(51) Int. Cl.
*H04L 12/801* (2013.01)
*H04L 12/841* (2013.01)
*H04L 12/823* (2013.01)

(52) U.S. Cl.
CPC ............ *H04L 47/115* (2013.01); *H04L 47/28* (2013.01); *H04L 47/32* (2013.01)

(58) Field of Classification Search
CPC ......... H04L 47/28; H04L 47/32; H04L 47/115
See application file for complete search history.

(56) References Cited

U.S. PATENT DOCUMENTS

| 6,535,482 B1 | 3/2003 | Hadi Salim et al. |
| 7,730,201 B1 * | 6/2010 | McAllister .......... H04L 12/5602 709/233 |
| 8,493,860 B2 | 7/2013 | Racz et al. |
| 2010/0027547 A1 * | 2/2010 | Shinozaki ............... H04L 47/10 370/394 |
| 2010/0182907 A1 * | 7/2010 | Pinter ..................... H04L 47/18 370/235 |

(Continued)

FOREIGN PATENT DOCUMENTS

| EP | 1146769 A2 | 10/2001 |
| WO | WO 2013034663 A1 | 3/2013 |

OTHER PUBLICATIONS

Ramakrishnan et al., RFC 3168, "The Addition of Explicit Congestion Notification (ECN) to IP", Sep. 2001 (Year: 2001).*

*Primary Examiner* — Gary Mui
(74) *Attorney, Agent, or Firm* — Leydig, Voit & Mayer, Ltd.

(57) ABSTRACT

A method for managing flows in a network with a plurality of forwarding elements routing the flows between network entities of a network or network domain includes marking flows between network entities with congestion information by at least one of the forwarding elements such that the highest congestion level prevailing on the respective flow path is indicated, identifying locations of one or more possible and/or present bottlenecks and/or congestions in the network based on the congestion information, and performing one or more actions to avoid, mitigate, and/or resolve the identified possible and/or present bottlenecks and/or congestions.

30 Claims, 10 Drawing Sheets

(56) References Cited

U.S. PATENT DOCUMENTS

| | | | |
|---|---|---|---|
| 2011/0032935 A1* | 2/2011 | Yang | H04L 47/10 370/389 |
| 2011/0235528 A1 | 9/2011 | Racz et al. | |
| 2013/0322237 A1* | 12/2013 | DeCusatis | H04L 47/33 370/230 |
| 2014/0029420 A1* | 1/2014 | Jeong | H04L 12/5692 370/229 |
| 2014/0071814 A1* | 3/2014 | Landscheidt | H04L 41/0816 370/229 |
| 2014/0162647 A1* | 6/2014 | Kato | H04Q 3/0091 455/435.2 |
| 2015/0043346 A1* | 2/2015 | Miller | H04L 47/122 370/234 |
| 2016/0134464 A1* | 5/2016 | Centonza | H04W 28/0247 370/236 |
| 2016/0380896 A1* | 12/2016 | Caulfield | H04L 47/12 370/235 |
| 2017/0078209 A1* | 3/2017 | Miklos | H04W 28/0236 |

* cited by examiner

METHOD AND SYSTEM FOR MANAGING FLOWS IN A NETWORK

CROSS REFERENCE TO RELATED APPLICATIONS

This application is a U.S. National Stage application under 35 U.S.C. § 371 of International Application No. PCT/EP2014/065255 filed on Jul. 16, 2014. The International application was published in English on Jan. 21, 2016 as WO2016/008519 A1 under PCT Article 21(2).

FIELD

The present invention relates to a method for managing flows in a network with a plurality of forwarding elements routing flows between network entities of a network or network domain. The present invention further relates to a system for managing flows in a network with a plurality of forwarding elements routing flows between network entities of a network or network domain.

BACKGROUND

Due to the rising virtualization of networks a multitude of different resource types may impact the data transmission additionally to the link bandwidth between different network nodes. In virtualized networks such as in a data center environment so-called network functions are decoupled from the physical hardware and are executed on virtual machines as virtual network functions instead. The granularity of such network functions and virtual machines is usually only limited by the hosting machines' memory resources and processing capabilities such that it would be possible to instantiate dedicated network functions for traffic.

However, this means that congestion or an insufficient quality of data transmission are also increasingly caused by resource bottlenecks which are caused by the performance of the networking functions, virtual machines or other entities, for example due to processing load, memory load, input/output interface or the like.

Another problem of the increasing heterogeneity and complexity of data networks is that the plurality of different types of resources may have a negative impact on the data transmission. For example in wireless and wired networks the resources used for data transmission are the main resource bottleneck. For instance in a wireless access network the shared radio spectrum needs to be distributed between transmitting and receiving user devices and traffic flows while in fixed access networks the capacity of a point-to-point link depends on the transmission medium such as fiber or copper lines or the like.

To overcome these problems the resources can be simply physically scaled up, for example by increasing a number of base stations or data center resources. However, this is often not a feasible option owing to the ever widening gap between an exponential increase in demand and the average revenue per user.

Conventional methods address the above mentioned problems by taking into account the utilization of queue resources as an indication of congestion. In general they are based on a coarse-grained end-to-end method for managing congestion due to high queue utilization. Congestion is explicitly notified towards the source nodes of a congested flow which in turn may typically scale down their respective throughputs in order to reduce the resource utilization and hence relief congestion.

Such a method is shown in the standard RFC 3168 specified by IETF named explicit congestion notification ECN. The explicit congestion notification ECN allows the mobile network nodes, i.e. in a GPRS/EPS network the gateway GPRS support node GGSN, the serving GPRS support node SGSN, the radio network controller RNC or the node B or in a EPS/LTE network the packet data network PGW, the serving network SGW or the evolved node eNB, or routers, switches or the like in the mobile backhaul/transport network to detect congestion by some random early detection RED process and then set the explicit congestion notification identification in the IP header of the user plane packets upon congestion.

According to the current specification of RFC 3168 the explicit congestion notification ECN is signaled to the data sink, i.e. the receiver which will upon receipt of the explicit congestion notification indication either try to downgrade the sending rate, for example by re-negotiating the media code in case of voice or multimedia communication, through application level control signaling or signal to the sender via transport protocol signaling that the network is congested, for example in TCP acknowledgements according to IETF RFC 5562.

However, the above mentioned conventional explicit congestion notification method has several shortcomings: Since it is an end-to-end communication, higher end-to-end latency will cause delay in taking control measures and have thereby an adverse impact on delay-sensitive and/or loss sensitive application flows. Another problem is that a coarse grained notification of congestion is provided as a simplistic binary indicating only the presence or absence of congestion but no other information such as the level and location of congestion, is available enabling a source node to control the sending rates.

According to RFC 3168 the explicit congestion notification information is provided by means of packet marking: Whenever the queue size exceeds a certain specified threshold the packet is marked. However it may be that even when the queue size is just below the corresponding congestion notification threshold the average waiting time of packets belonging to some delay-sensitive application are higher than what is required to meet the application quality of experience QoE requirement. The node is congested from the application perspective but a end node is not aware of it because the congestion notification information threshold has not been exceeded.

A further problem is that congestion is controlled in an uncoordinated and distributed way where each source node reduces the data rate of its respective flows according to some preconfigured value while remaining oblivious to the other flows sharing the same congested node. This leads in a non-optimal utilization of resources while throughput sensitive flows may get needlessly penalized by the congestion notification.

The above mentioned problems are addressed in U.S. Pat. No. 6,535,482 B1: A method is described wherein the congestion level or degree of congestion being experienced by flows is indicated to the source nodes upon the coarseness of the congestion notification. A congestion monitor determines a degree of congestion by a random early detection RED process and then notifies the source nodes via a separate ICMP Source Quench ISQ control packet generated by the corresponding congested router or node. Upon receiving the ISQ control packets the source node performs preemptive actions to reduce the level of congestion in proportion to the indicated congestion level or degree of congestion. The congested router also marks subsequent data packets by enabling the Congestion Experienced CE flag in order to prevent subsequent routers from sending ISQ control packets and hence reduces the signaling overhead. The packets are marked in proportion to a relative bandwidth used by each flow.

Further in U.S. Pat. No. 8,493,860 B2 a method of congestion detection and location is described in a radio access transport network. The radio access transport network comprises one or more network controllers each coupled with one or more radio base stations. Data packet flows are each associated with a mobile radio terminal communication and each flow is controlled by a corresponding flow control entity. The flows are monitored for congestion in the transport network. If a congestion area in the transport network is detected for one of the monitored data packet flows then a determination is made whether other monitored data packet flows share the detected congestion area. In such a case congestion notification information is communicated to the flow control entities corresponding to other monitored data packet flows sharing the detected congestion area. Based on the congestion notification information the informed flow control entities may take flow control actions. However, one of the problems is that congestion may only be detected within the radio access network. Further only the source nodes of the congested flows are notified for controlling congestion.

The aforementioned conventional methods and systems cause a high signaling load due to separate control packets for the congestion notification. Further the congestion notification is provided to the source nodes which may be distributed and which are usually not aware of quality of experience expectations of users. Another problem is that the congestion notification is sent only by routers closest to the source nodes or within the radio access network and the source nodes may not be aware of the highest level of congestion within the network resulting in a higher delay to mitigate congestion. An even further problem is that source nodes scale down their respective throughputs without taking into account quality of service or quality of experience requirements. Besides the method disclosed in U.S. Pat. No. 8,493,860 the location of the congestion is not known to the source nodes.

SUMMARY

In an embodiment, the present invention provides a method for managing flows in a network with a plurality of forwarding elements routing the flows between network entities of a network or network domain. The method includes marking flows between network entities with congestion information by at least one of the forwarding elements such that the highest congestion level prevailing on the respective flow path is indicated; identifying locations of one or more possible and/or present bottlenecks and/or congestions in the network based on the congestion information; and performing one or more actions to avoid, mitigate, and/or resolve the identified possible and/or present bottlenecks and/or congestions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
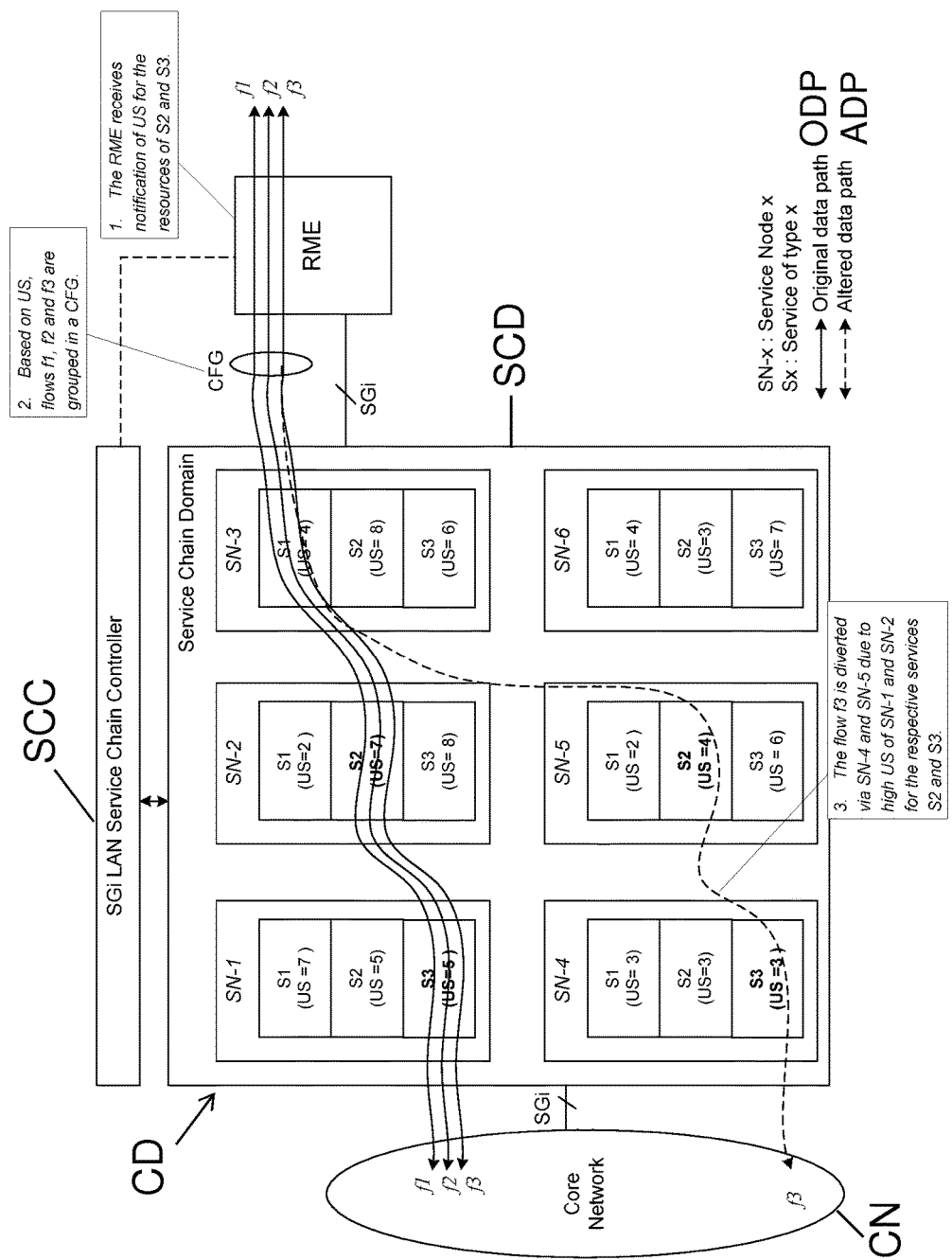
FIG. 1 shows schematically a system according to an embodiment of the present invention.

A method and a system for managing flows in a network are described herein which allow determining congestion more precisely, preferably in terms of location.

A method and a system for managing flows in a network with greater flexibility are described herein, i.e. in particular in terms of determining congestion and within a greater part of a network.

A method and a system for managing flows in a network requiring fewer resources for determination, notification and mitigation of congestion are described herein.

A method and a system for managing flows in a network enabling a faster reaction on changing traffic and/or computational requirements are described herein.

A method and a system for managing flows in a network providing an easy and cost effective implementation are described herein.

A method and a system avoiding expensive and explicit calculation of traffic flows to traffic paths and node information are described herein.

A method for managing flows in a network is defined with a plurality of forwarding elements routing flows between network entities of a network or network domain. The method is characterized in that (a) flows between network entities are marked with congestion information, preferably in form of resource utilization information, by at least one of the forwarding elements such that the highest congestion level prevailing on the respective flow path is indicated, (b) the locations of one or more possible and/or present bottlenecks and/or congestions in the network based on the congestion information are identified, and (c) one or more actions are performed to avoid, mitigate, and/or to resolve the identified possible and/or present bottlenecks and/or congestions.

A system for managing data flows in a network with a plurality of forwarding elements routing flows between network entities of a network or network domain is defined. The system is characterized by at least one forwarding element operable to mark flows between network entities are marked with congestion information, preferably in form of resource utilization information, by at least one of the forwarding elements such that the highest congestion level prevailing on the respective flow path is indicated, and identification means operable to identify the locations of one or more possible and/or present bottlenecks and/or congestions in the network based on the congestion information, and action means operable to perform one or more actions to avoid, mitigate, and/or to resolve the identified possible and/or present bottlenecks and/or congestions.

As used herein, the term "congestion information" is to be understood in the broadest sense, covering not only one piece of congestion information or data but also a plurality of pieces of congestion information. For instance a plurality of congestion levels or the like may be included in the congestion information. The term "congestion information" is further to be understood as information from which congestion for a network entity may be directly or indirectly derived.

According to systems and methods described herein, resource bottlenecks and congestion can be reliably identified, the entities or nodes in the network or network domain on a flow's path that may be or are the cause of congestion can be reliably identified, the type of resource or resources forming a bottleneck that may lead towards or cause congestion can reliably be identified, an effective management of resources, in particular at traffic aggregation points like forwarding elements, can be enabled, and flows that satisfy user expected quality of experience (QoE) can be identified. Also according to systems and methods described herein, in a flexible way congestion avoidance rules, congestion mitigation rules and/or congestion resolving rules or policies can be applied to pro-actively avoid, mitigate and/or resolve the bottlenecks and/or congestions. Additionally according to systems and methods described herein, a quick reaction on changing traffic or computational requirements is possible, since for example congestion levels throughout the flow path are amended such that the highest congestion level prevailing on the respective flow path is indicated. Moreover, according to systems and methods described herein, effective congestion mitigation can be applied since each flow is marked with the highest congestion level on its path and there a precise identification of bottle necks/congestions is enabled.

As used herein, the term "node" or "forwarding element" can refer to any physical/virtual switch, router, gateway, network function, or mobile network entity such as packet data network gateway P-GW, a serving gateway S-GW, that can forward a packet based on IP header processing. A node or forwarding element can also be a server or a chain of servers, e.g. part of an SGi LAN in a mobile network and/or in a data center, providing different services to flows such as, but not limited to, load balancing, firewall, security, Deep Packet Inspection DPI, authentication, transcoding etc.

As used herein, the term "resource" can be used to signify network resources such as link capacity, delay, errors etc, and node resources or forwarding element resources such as, but not limited to, a memory, one or more central processing units, processing cores, hypervisors, virtual machines, network interface cards (NIC), storage, etc.

As used herein, the term "control entity" can refer to any C-plane entity such as, but not limited to, a mobility management entity MME, a policy and charging rules function PCRF, a home subscriber server HSS, a Home/Visitor location register H/VLR, an Open Flow Controller OFC, a cloud controller, a data center resource manager, etc.

Embodiments of the present invention provide a method and a system in which the highest level of congestion in a node on a flow path is indicated which may result in network congestion and thereby affecting the quality of service QoS or quality of experience QoE intended for the application of the flows. The corresponding packets are marked with the highest congestion level prevailing on the corresponding flow path enabling that actions may be taken to mitigate the effect of the high congestion, i.e. the identified bottle neck/congestion.

According to a preferred embodiment resource utilization information of a network entity via which, to or from a flow is transported is included into the congestion information. One of the advantages is, that based on resource utilization information a precise determination of congestion or a possible congestion can be determined. Resource utilization information includes for example the load on the network entity, the available bandwidth, etc.

According to a further preferred embodiment, a central management entity in a network domain performs identification of the locations of one or more possible and/or present bottlenecks and/or congestions in the network based on the congestion information, and one or more actions to avoid, mitigate, and/or to resolve the identified possible and/or present bottlenecks and/or congestions. When the central management entity, preferably a resource management entity, receives the congestion information, it can identify the location or locations of potential and/or present congestions of the corresponding flows enabling an identification of a path bottleneck for example in a network domain like a mobile network, a data center or the like. A further advantage of the centralized management is, that the centralized management entity has complete knowledge about all congestion information and flows passing through congested forwarding elements. Therefore actions for mitigating the bottlenecks and/or the congestions or proactively avoid possible or announcing congestions can be very efficiently applied.

According to a further preferred embodiment the central management entity is co-located or integrated with an aggregation node of the network. This enables to easily instantiate a central management entity without having to add a further physical entity. When co-located or integrated with an aggregation node resource inefficient data exchange for transmitting congestion information can be reduced.

According to a further preferred embodiment based on congestion information for each flow a corresponding flow congestion signature is determined and flows having a similar flow congestion signature are logically grouped together to a congestion flow group. By grouping flows having similar congestion signatures an easy handling of these flows and of congestion(s) related to the flows is possible. Actions to mitigate congestion or to pro-actively avoid congestion can then take the corresponding congestion signature into account. Therefore time consuming generation and identification of actions for each flow can be avoided.

According to a further preferred embodiment one or more actions to avoid, mitigate, and/or to resolve the identified possible and/or present bottlenecks and/or congestions are determined and performed for each flow congestion group individually. This enables to simplify congestion mitigation by determining corresponding actions for such groups only and not for each flow individually. For instance actions for mitigation of the congestion can take into account the corresponding signature. Therefore time and resource consuming application of the actions for each flow can be avoided.

According to a further preferred embodiment the congestion level is indicated by one or more congestion scores, preferably in form of one or more utilization scores. Such congestion scores, preferably utilization scores provide an individual value in a simple way for indication of a congestion level. Only few resources like memory have to be used. Also comparing the one or more congestion scores, preferably utilization scores with each other to determine for example which of the flows has the higher congestion level can be performed very easily. If there is a plurality of congestions scores e.g. for different resources of the forwarding element then these congestions scores may be combined, e.g. weighted against each other, to result in a single congestion score for the forwarding element and this congestion score may then be used for comparison with congestion scores of other forwarding elements. Further congestion scores e.g. for different resources of forwarding elements may be compared with each other for instance when having similar or comparable resources, and other congestions scores for other resources may be neglected or may be weight with said congestion score or the like.

According to a further preferred embodiment flows between network entities marked with congestion information are also marked with additional information related to the properties of the respective forwarding elements, preferably identity and/or type and/or status of the respective forwarding elements and/or its resource elements. By adding additional information, the central management entity may for example apply differentiated mitigation policies or rules on specific flows or group of flows based on application requirements and in view of the type and status of the resources/resource elements of the forwarding elements.

According to a further preferred embodiment congestion levels of different resources in the same or different forwarding elements are normalized for comparison. This enables to easily use or include different types of nodes and different types of resources within the same network entity having different semantic interpretations of congestion levels within for example a specific domain. For example resources in form of memory load and processor load on each of different forwarding elements are normalized by first normalizing on each forwarding element its own resources and then normalize them across different forwarding elements.

According to a further preferred embodiment said one or more actions are determined and performed based on application requirements and/or type and/or status of resources of said one or more forwarding elements. This ensures that actions can be more precisely selected respectively adapted and finally performed when respecting the type, status and/or requirements of applications.

According to a further preferred embodiment only flows within one or more predetermined domains represented by one or more forwarding elements are included when performing the method. This ensures that only forwarding elements are included for performing actions which are for example predetermined by an operator and of his interest. Thus, a waste of resources is avoided.

According to a further preferred embodiment one or more traffic management functions preferably traffic pacing, shaping, trans-coding, packet dropping, flow re-routing and/or virtual resource instantiation and provision is performed as said one or more actions. This enables in an efficient and flexible way to mitigate congestion when performing said actions.

According to a further preferred embodiment a resource use level of resources and/or performance parameters of a forwarding element are included into the resource utilization information. This enables for instance to determine a precise while easy to compare utilization score based on the use level of resources of the forwarding element and performance parameters.

According to a further preferred embodiment a resource of a forwarding element is provided in form of a memory, central processing units and/or link bandwidth and/or performance of a forwarding element is represented by packet waiting time, packet drop ratio, central processing unit load, hypervisor, switching time and/or link utilization. This allows in an easy way a precise determination of the resource use level of a forwarding element.

According to a further preferred embodiment the one or more congestion scores, preferably the one or more utilization scores, are provided in form of single scalar quantity. Different congestion scores of a forwarding element are then "merged" into a single scalar value, allowing for example an easy comparison between congestion or utilization scores of different forwarding elements.

According to a further preferred embodiment for a flow one or more utilization levels are determined for different resource types. This allows for example when providing a global utilization score for a forwarding element to weigh different utilization levels or congestion levels to determine an overall congestion level. Therefore depending on the type of the forwarding element for example a different weighing can be applied. Thus, flexibility is enhanced.

According to a further preferred embodiment the congestion information is provided in form of values of the one or more determined congestion levels. This enables in an easy way to provide precise and easy comparable information for determining actions to mitigate a determined congestion.

According to a further preferred embodiment marking of a flow is performed by sending explicit messages or by piggy-backing the information over user plane packets of the flow, preferably by means of extension headers and/or transmission protocol extensions. For example when using piggy-backing over packets in the user plane in particular with using extensions then a complicated and time consuming establishment of an additional protocol for exchanging congestion information can be avoided. The congestion information can be simply included in extensions of a conventional transmission protocol, thereby providing a reliable transmission According to a further preferred embodiment upon receiving a packet of a flow by a forwarding element, the forwarding element checks whether the received packet has already been marked and if yes, the forwarding element compares the congestion information with its present congestion level or score and sets the congestion information corresponding to the present congestion level or score if its present congestion level corresponds to a higher congestion level, otherwise congestion information is not altered, and if no, the forwarding element sets the congestion information corresponding to the present congestion level or score of the forwarding element. This enables in an easy and efficient way to convey with the congestion information the highest congestion level prevailing on the respective flow path.

According to a further preferred embodiment marking for flows is performed in uplink direction and in downlink direction. This enables a differentiation between different congestion levels in downlink and uplink direction. Thus the bottleneck location in terms of the direction of the corresponding flow can be even more refined.

According to a further preferred embodiment for providing the congestion information in the uplink path and in the downlink path, preferably to the central management entity, the congestion information in the downlink path is copied to packets in the uplink path. This enables for example in an easy way to provide the congestion information in both directions to the central management entity: The highest level of congestion in the uplink direction is copied by the source to packets in the downlink direction and on the downlink path the corresponding congestion information for the downlink path is added, so that the central management entity can receive both congestion levels.

According to a further preferred embodiment an intermediate entity within the path of the flow checks receiving congestion information of corresponding flows and updates the congestion information in the uplink direction if the congestion information in the downlink direction indicates a higher congestion level than the congestion information in the uplink direction. This ensures that—since the state or level of resource congestion is transient—the centralized management entity is provided with the latest congestion information with minimum possible delay. For example a serving gateway SGW upon receiving the uplink packet compares the utilization score value copied by the end node, for example the evolved node B into the GTP extension header with the latest utilization score value of the corresponding downlink packet prevailing between the packet data network PGW and the serving gateway SGW. If the latest utilization score value indicated in the IP header option is greater than the previously recorded downlink utilization score value in the GTP extension header, the serving gateway SGW replaces the previous utilization score value with the latest utilization score value in the GTP extension header of the uplink packet. In case of a PMIP based link between the packet data network PGW and the serving gateway SGW the serving gateway SGW can copy the utilization score value in the GTP extension header into the outer IP header option.

According to a further preferred embodiment a congestion trend based on congestion information with regard to the congestion level over time is included into the flow congestion signature. This enables to handle flows more precisely. For example the central management entity can derive and invoke a predetermined congestion mitigation procedure based on some policy or rule when a corresponding congestion trend indicates a high congestion level.

According to a further preferred embodiment a persistence of congestion is determined for the flow congestion signature based on a time difference between congestion information. A persistence of congestion can enable the central management entity for example to distinguish between transient and persistence congestions and may invoke corresponding suitable control actions to mitigate congestion based on a determined persistence.

According to a further preferred embodiment one or more actions to at least mitigate, preferably resolve the identified bottle necks and/or congestions are performed only if said time difference and/or the congestion trend exceeds a predetermined threshold, preferably wherein the threshold is application specific. This enables for example the central management entity to handle flows more efficiently based on the application type, etc. For example a node with a utilization level corresponding to a 60% utilization of an egress queue may be considered to be highly congested with reference to some delay sensitive application such as voice communication, while it may not be considered congested at all for a delay tolerant application with low quality of experience requirements.

According to a further preferred embodiment previously received congestion information is temporarily stored for a certain hold time, preferably wherein the hold time is specific for each flow. For example long lived flows will have a higher value of the hold time then a short lived flow and prevent the central management entity against a wrong interpretation of the time difference between successive congestion information. Thus a more reliable and precise congestion mitigation can be performed.

According to a further preferred embodiment the congestion information is communicated as a new IPv4 option, a new IPv6 extension header and/or a new GTP extension header. This allows an easy encoding of congestion information in particular into conventional transmission or communication protocols.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

In the following figures the term "utilization score" is used as an example for the more general term "congestion score", i.e. a congestion score may be indicated by a utilization score for example.

FIG. 1 shows schematically a system according to a first embodiment of the present invention. In FIG. 1 an example congestion mitigation policy inside the data center scenario is shown. Further shown is a core network CN connected via a service chain domain SCD comprising six service nodes SN-1, . . . , SN-6. These are connected to a resource management entity RME which is in turn also connected to a SGi LAN Service Chain Controller SCC. The service nodes SN-1, . . . , SN-6 define a congestion domain CD for which congestion is to be monitored.

Further three flows f1, f2 and f3 are shown passing from the core network CN via the service nodes SN-1, SN-2 and SN-3 and via the resource management entity RME to user devices. Each of the service nodes SN-1, . . . , SN-6 provides application services which are denoted with reference sign S. The three flows f1, f2, f3 belong to a single congestion flow group CFG preferably based on an earlier notification of a congestion score, here provided in form of a utilization score US and a congested node identification. The flows f1, f2, f3 are passing through the service nodes SN-1, . . . , SN-6 as part of the service chain that exists inside a data center for example. Each service node SN-1, . . . , SN-6 can be a server that may provide one or more network and/or the application services S1, S2, S3 such as load balancing, access control, firewall, trans-coding, security or the like.

The resource management entity RME which is also interfaced with a control plane entity like the SGi LAN Service Chain Controller SCC here is made aware of path utilization information of the services S2 and S3 in the service nodes SN-1 and SN-2. If the services are getting congested then the resource management entity RME may decide to divert the flow f3 over service nodes SN-4 and SN-5 that may host the same services S2 and S3 or the resource management entity RME may request the service chain controller SCC to instantiate S2 and S3 over available virtual machines or instantiate new virtual machines for hosting S2 and S3 where the flow f3 can be diverted to.

In more detail the flows f1, f2 and f3 pass service S3 with a utilization score US of 5 of the service node SN-1, the service node SN-2 with service S2 and a utilization score of 7 and finally the service node SN-3 with the utilization score of 4 for the application service S1. The resource management entity RME receives notifications of the corresponding utilization scores US, e.g. for the services S2 and S3 in the service nodes SN-2 and SN-1 respectively.

Based on these utilization scores US the flows f1, f2, f3 are grouped into the same congestion flow group CFG. The SGi LAN Service Chain Controller SSC may then—based on a corresponding indication of the resource management entity RME—divert, i.e. route the flow f3 over the service nodes SN-5 and SN-4 having for the respective services S2 and S3 a lower utilization score US compared with the corresponding services S2 and S3 in the service nodes SN-2 and SN-1. The altered data path ADP for flow f3 is shown as broken line in FIG. 1, whereas the unaltered, i.e. original data path ODP of each flow f1, f2, f2 is shown as a solid line. To calculate the level of utilization of the nodes respectively forwarding elements SN-1, . . . , SN-6 the respective resource utilization and/or performance parameters of the corresponding node or forwarding element SN-1, . . . , SN-6 is determined.

The resources of a forwarding element SN-1, . . . , SN-6 can be a memory, number of CPUs, link bandwidth. etc., while the packet waiting time, packet drop ratio, CPU load, hypervisor switching time, link utilization, are examples for performance parameters of a node/forwarding element SN-1, . . . , SN-6. A sustained high utilization of one or more of the resources will result in resource congestion, which will adversely impact the performance parameters, for example by incurring unwarranted delays and losses, and thereby having an adverse impact on the service quality of possibly all the flows that share the congested resource in the forwarding element SN-1, . . . , SN-6. The nodes SN-1, . . . , SN-6 monitor their respective resources, and derive a utilization score US, either for each resource individually, or derive an overall utilization score US by combining the utilization scores/factors US of the different resources and/or performance parameters as depicted in equation 1 below.

$$US = f_{US}(U_{mem}, U_{cpu}, U_q, P_w, P_d, \ldots) \quad (1)$$

where
US overall resource utilization of a node
$f_{US}$ function to calculate a utilization score
$U_{mem}$ memory utilization within a node
$U_{cpu}$ CPU utilization within a node
$U_q$ queue utilization within a node
$P_w$ packet waiting time in a node
$P_d$ packet drop ratio in a node The utilization value US, which preferably is a scalar quantity, reflects the level to which a node or a particular resource or a set of resources within the node is utilized. Several utilization scores US, e.g. reflecting different resource types, can be calculated for one path or flow.

Figure 2:
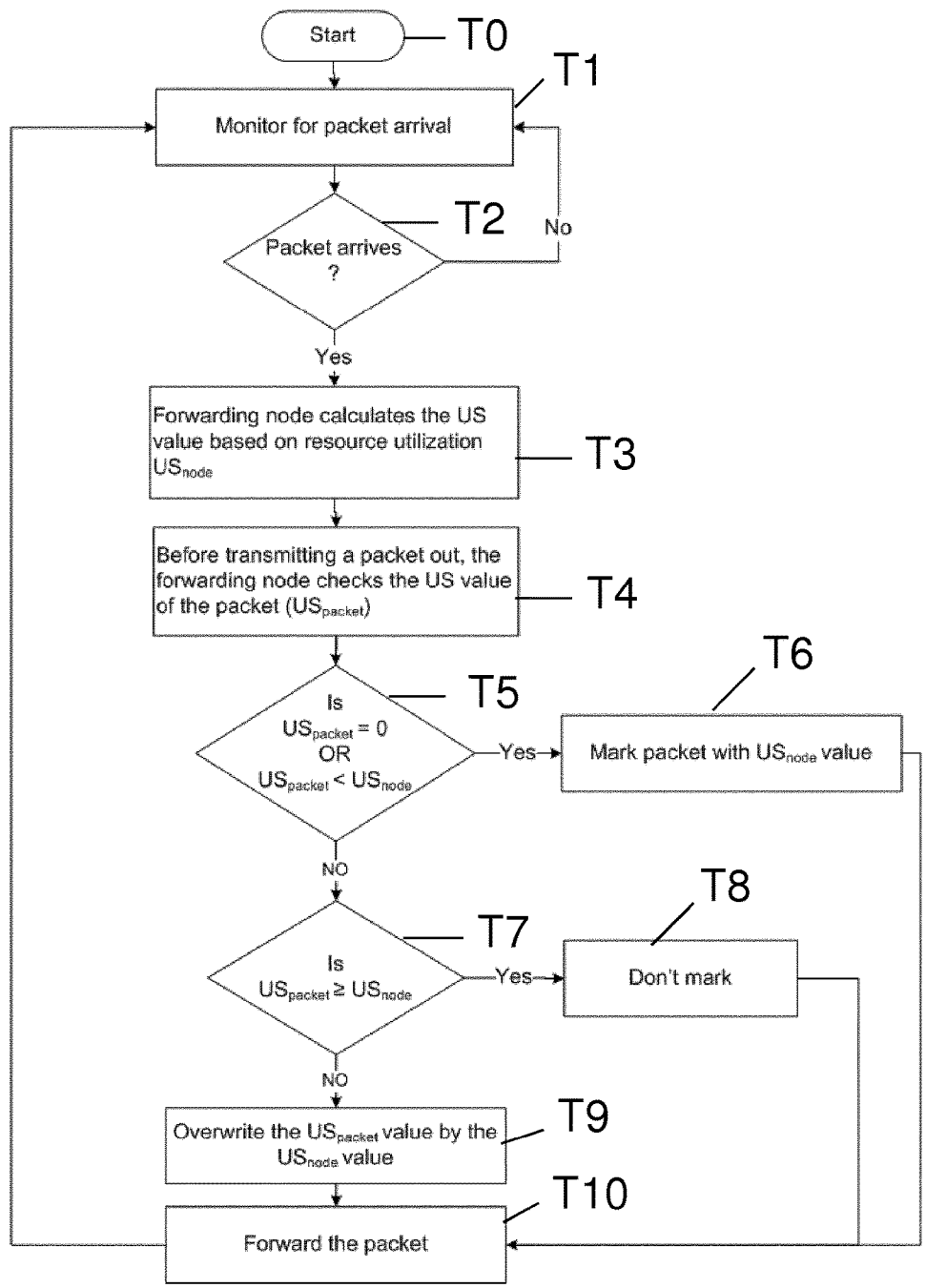
FIG. 2 shows schematically steps of a part of a method according to an embodiment of the present invention.

FIG. 2 shows schematically steps of part of a method according to a second embodiment of the present invention. In FIG. 2 the packet marking procedure is shown. In an initial step T0 the procedure is started. In a first step T1 an arrival of a packet of a flow is monitored. In a second step T2 it is checked if a packet has arrived or not. In a third step T3 when a packet has arrived the forwarding element or node on which the packet has arrived calculates a utilization score value US based on the utilization of resources of the forwarding element, i.e. $US_{node}$. If no packet has arrived in the second step T2 the monitoring for packet arrival is continued. When the forwarding node or element has calculated the utilization score US value in the second step T3 then in the fourth step T4 the forwarding node checks the utilization score US value of the packet before transmitting a packet out. In a fifth step T5 it is checked whether the utilization score US value of the packet is zero or less than the utilization score US value of the node $US_{node}$. If yes then in a sixth step T6 the packet is marked with a utilization score US value of the corresponding node and the packet is forwarded in a tenth step T10 and it is monitored for further packet arrival starting again from step T1. If the utilization score US value for the packet is not zero or less then the utilization score US value of the node then in a seventh step T7 it is checked whether the utilization score US value of the packet $US_{packet}$ is greater than or equal to the utilization score US value of the node $US_{node}$. If no then in a ninth step T9 the utilization score US value of the packet is overwritten by the utilization score US value of the node and the packet is forwarded in a tenth step T10 and the procedure starts again from step T1. If yes, i.e. the utilization score US value of the packet is greater than the utilization score US value of the node, then in an eight step T8 the packet is not marked and further the packet is forwarded in a tenth step T10 and the procedure is continued again from step T1. This ensures that the highest utilization score US value prevailing on a data path of a flow is provided.

In other words FIG. 2 shows the following: (1) upon receiving a packet, the corresponding node/forwarding element inspects if the packet has already been marked by some previous node on the data path; (2) if the packet has been marked previously, and if the marked utilization score US value—either the overall US value or the US values of individual resources—is greater than or equal to the related US value(s) of the present node, then the packet is forwarded without marking; and (3) if the packet is unmarked, or if the marked utilization score US value—either the overall utilization score US value or the utilization score US values of individual resources of the node—is less than the related utilization score US value(s) of the present node, then the node marks the packet by overwriting the previously marked utilization score US value(s) with the relevant utilization score US value(s) along with additional information just before forwarding.

This notification process is based on finding the maximum resource utilization value on a path for different flows and the ability to locate and identify the bottleneck link/node of a flow and/or set of flows due to persistently highly utilized resources, i.e. the serving nodes, forwarding elements or the like. For providing detailed congestion information an identification and address not only of the highly utilized node or nodes on a path is preferable as it will induce congestion in other nodes or forwarding elements due to back pressure but is also desirable to determine the type of the resource or node for taking appropriate actions to mitigate the congestion.

As mentioned above at the time of transmission the nodes mark the packets with one or more utilization score US values prevailing at the time of packet transmission. Further in addition to the utilization score US values the nodes or forwarding elements can add additional information such as: (1) a node id, i.e. an IP and/or MAC address of the marking entity, i.e. the node; (2) a cell-id or location/routing/tracking area of a flow as indicated by a base station in case of a mobile network (with reference to FIG. 4 it is the evolved node B eNB); (3) the maximum waiting time of a packet inside a congested node before being transmitted out; (4) a timestamp indicating the time at which the packet gets marked. This can be used by the resource management entity RME to determine the time relevance of the congestion information; (5) the type and utilization score US of individual resource(s). This additional information can be utilized by the resource management entity RME in exercising effective strategies of actions towards managing resource utilization over a flows' path for handling congestion as will be described later. In essence, a packet will be marked with multiple parameters indicating flow context information. It can either be sent as explicit messages, or piggybacked over user-plane packets by means of extension headers, e.g. as GTP-U header extension, IPv4 header option, IPv6 extension header or by means of dedicated protocol extensions.

Figure 3:
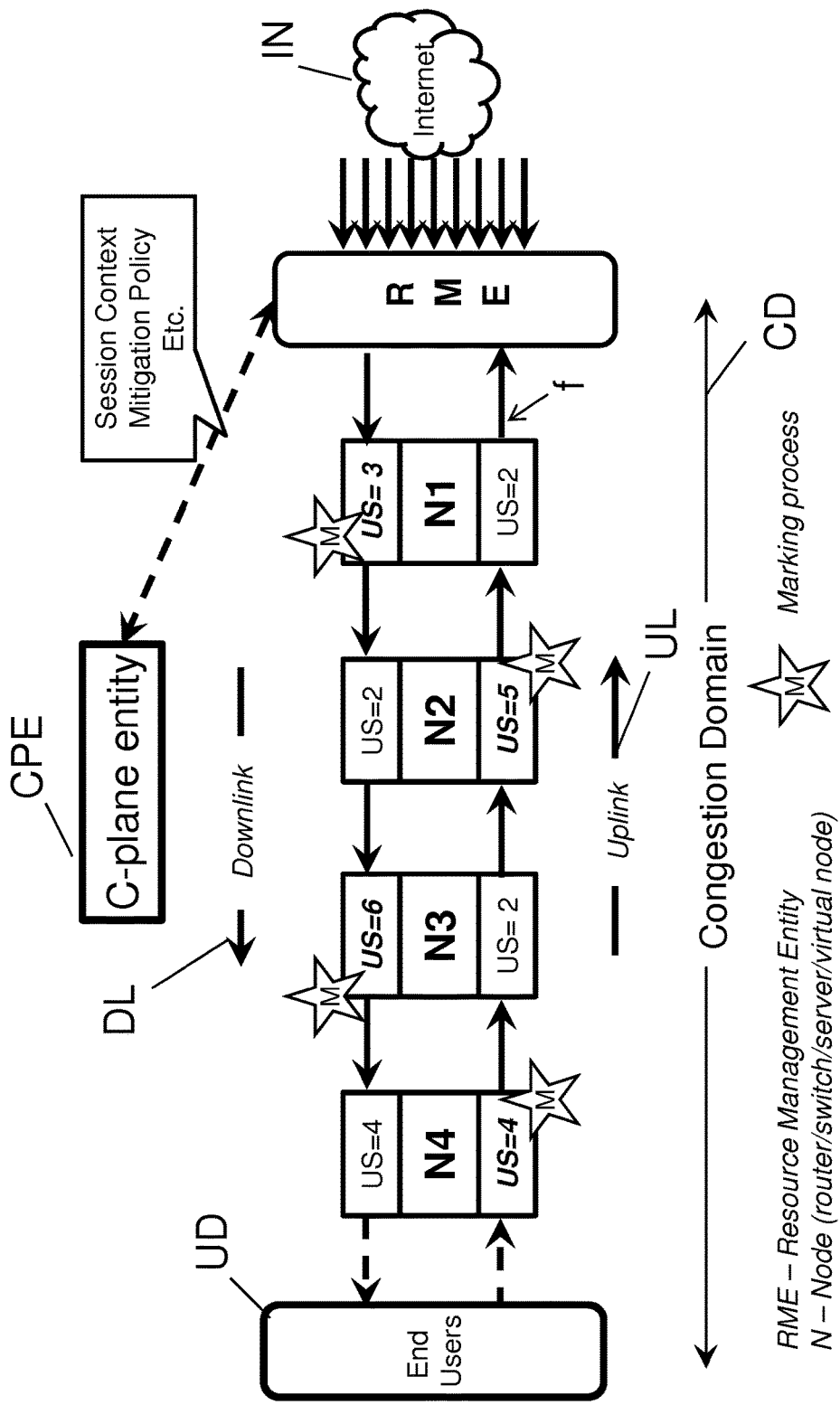
FIG. 3 shows schematically a system according to an embodiment of the present invention.

FIG. 3 shows schematically a system according to a third embodiment of the present invention. In FIG. 3 a flow f is shown which connects an end user device UD via four service nodes N1, . . . , N4 and a resource management entity RME to the internet IN. In the downlink direction DL, the service nodes N1 and N3 mark the packets (marking is indicated by reference sign M within a star assigned to the respective node N1, . . . , N4) according to the marking rules as described in FIG. 2. The service node N3 overwrites the utilization score US value marked previously by service node N1 since the utilization score US for the service for the flow is higher in service node N3 than in service node N1. Similarly in the uplink direction service nodes N4 and N2 mark the packets according to the marking rules and service node N2 marks the packets by overwriting the utilization score US value marked by the service node N4 knowing that the utilization score US in uplink direction UL for the flow in service node N2 is higher than the corresponding utilization level/score in service node N4. A C-plane entity, i.e. a control plane entity CPE like a policy and charging rules function PCRF has an interface to the resource management entity RME for providing or updating session context mitigation policies for the resource management entity RME.

Figure 4:
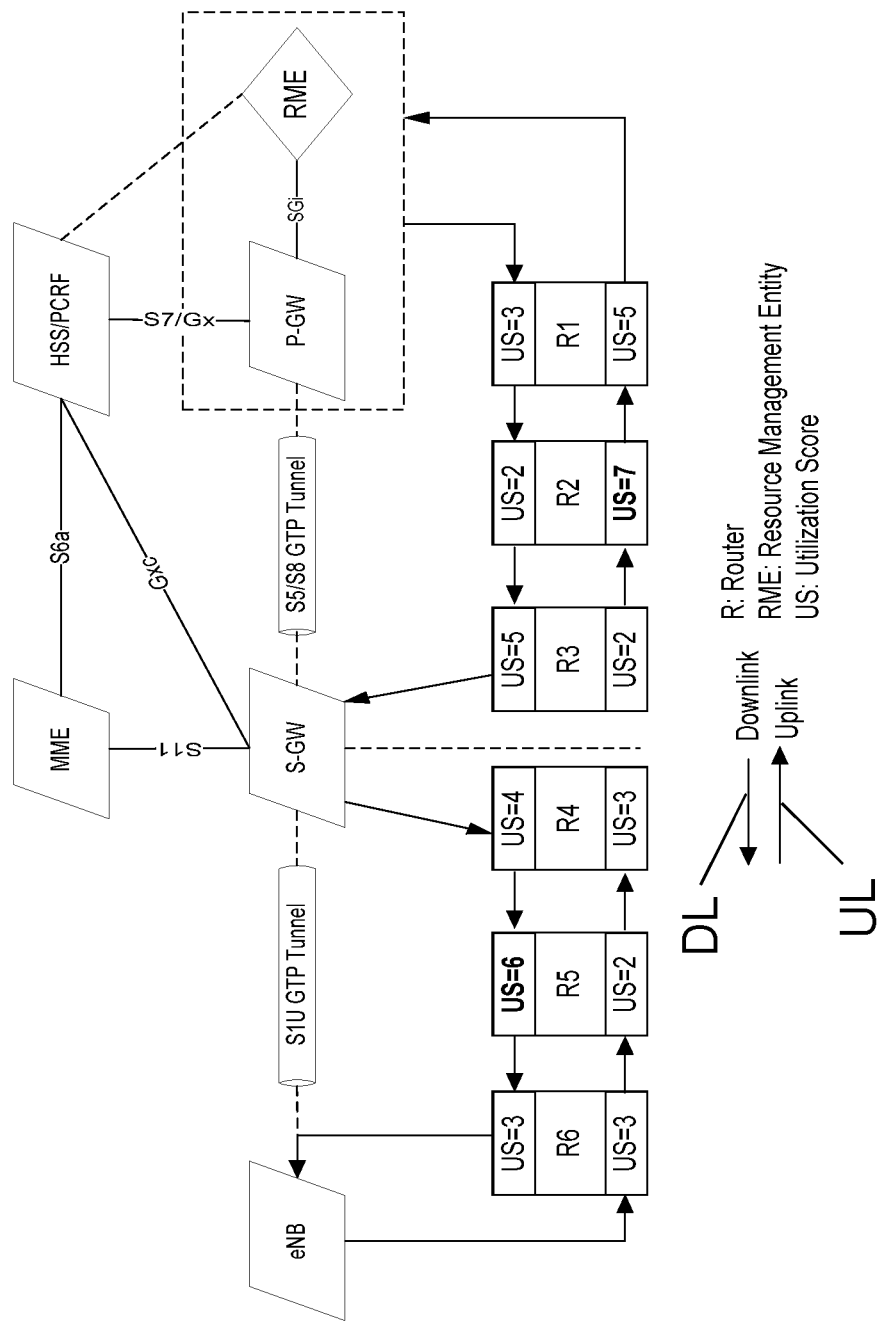
FIG. 4 shows schematically a system according to an embodiment of the present invention.

FIG. 4 shows schematically a system according to a fourth embodiment of the present invention. In FIG. 4 an example of an application to an LTE EPS network is shown. Flows are established between an evolved node B eNB and a core network via a serving gateway S-GW. The utilization score value is part of the congestion information and is notified to the resource management entity RME with reference to an EPC based mobile network overlaid over a transport/backhaul network infrastructure. The resource management entity RME is located at a traffic aggregation point over the SGi interface with an interface to the control plane entity, i.e. here the policy and charging rules function PCRF.

The resource management entity RME can also be integrated with the network ingress router or gateway, i.e. the packet data network gateway P-GW or the gateway GPRS support node GGSN. The resource management entity RME may also be part of the control plane entity, i.e. the policy and charging rules function PCRF. Within the EPC network constituting the congestion domain CD the data packets are communicated over EPC bearers which in turn are tunneled between the evolved node B eNB and the serving gateway SGW and between the serving gateway SGW and the packet data network gateway PGW using GPRS tunneling protocol abbreviated with GTP. An external IP header, for example IPv4 or IPv6 is appended to the GPRS tunneling protocol GTP packets for the transport and routing by the routers R1-R6 of the underlying transport/backhaul network.

In more detail the routers R1-R6 have in uplink UL and downlink DL direction different utilization score US values. These are shown at a specific time for uplink and downlink traffic. For sake of simplicity only the routers mark the corresponding packets of the flow. However of course all forwarding nodes taking part in conveying the flow, i.e. the user plane nodes such as the evolved node B eNB, the serving gateway S-GW, etc., i.e. all forwarding nodes of a mobile network determine also their respective utilization score values and mark the packets based on the marking described above correspondingly.

As it is shown in FIG. 4 a router R1-R6 may have different utilization score values in uplink UL and downlink DL direction depending on the level of utilization of the respective resources/routers R1-R6. For example router R3 has a utilization score US=5 in the downlink DL direction and utilization score US=2 in the uplink UL direction. Based on the marking rules described in FIG. 3, the packets in the downlink DL direction will be marked by router R1 with US=3, router R3 because of US=5>US=3 and router R5 because of US=6>US=5, whereas routers R2, R4 and R6 so not mark the packets because the prevailing US values in these routers are less than the US values carried by the packet at the time. Similarly in the uplink UL direction, only routers R6 with US=3 and R2 because of US=7>US=3 mark the packets respectively.

Figure 5:
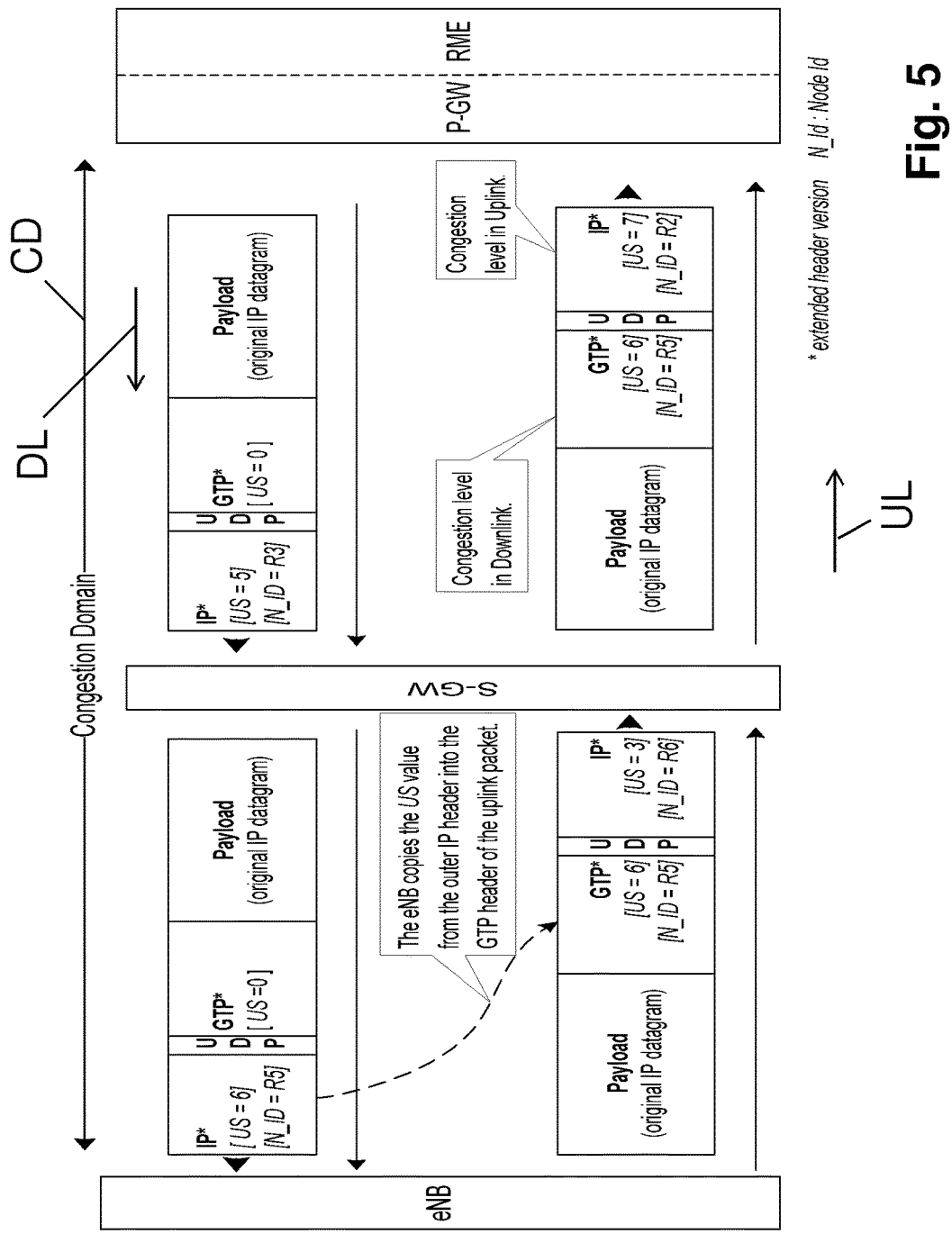
FIG. 5 shows schematically a system and method according to an embodiment of the present invention.

FIG. 5 shows a system and method according to a fifth embodiment of the present invention. In FIG. 5 the packet marking with the GPRS tunneling protocol GTP is shown. For a notification the utilization score US value or more general the congestion information multi-tuple parameter is piggybacked over user plane packets by encoding them over the IP and GTP-U header extensions. The outer IP header is continued to get marked with the highest utilization score US value prevailing on the downlink path DL as described above. The end node of the congestion domain CD which is preferably the last node before user device UD of an end user and with reference to the evolved node B eNB upon receiving this marked packet simply copies the congestion information parameter in the outer IP header option to the GTP extension header of the corresponding uplink UL data packets that either belongs to the corresponding uplink bearer or that is transmitted to the same packet data network gateway PGW. For example in the downlink DL direction in the outer IP header a utilization score of US=5 is shown with the corresponding node identification being router number 3, i.e. R3. The GTP extension header includes a utilization score of US=0, since it is for the uplink packets.

After passing the serving gateway SGW and when reaching the evolved node B eNB the congestion information CI has changed indicating now as highest utilization score US=6 for router R5. The evolved node B eNB then copies the utilization score value US=6 and the corresponding ID from the outer IP header into the GTP header of the uplink packet that either belongs to the corresponding uplink bearer or that is transmitted with the same packet data network gateway PGW.

In the uplink direction UL the intermediate forwarding nodes or forwarding elements continue marking the outer IP header of the packets with the utilization score US as described above. When the packet is received at the packet data network gateway PGW the congestion information parameter comprises or indicates in the outer IP header option the highest utilization score US value in the uplink UL direction while the congestion information parameter in the internal GTP extension header indicates the utilization score US value in the downlink DL direction together with the corresponding ID's of the marking nodes/forwarding elements. The packet data network gateway PGW notifies the resource management entity of the uplink UL and downlink DL utilization status including the location ID of the bottleneck node/link either directly using some proprietary signaling protocol over the SGi interface or via the control plane entity for example the policy and charging rules function PCRF.

Since the level of utilization is transient, the intermediate forwarding node like the serving gateway SGW in FIG. 5 may compare upon receiving an uplink packet a utilization score US copied by the end node, here the evolved node B, into the GTP extension header with the latest utilization score US value of the corresponding downlink packet prevailing between the packet data network PGW and the serving gateway SGW: If the latest utilization score US value indicated in the IP header option is greater than the previously recorded downlink US value in the GTP extension header, the serving gateway SGW replaces the previous utilization score US value with the latest utilization score US value in the GTP extension header of the uplink packet. The congestion marking and notification procedure as shown can be performed in parallel with conventional ECN processes.

In case of a PMIP based link between the packet data network gateway PGW and the serving gateway SGW, the serving gateway SGW can copy the utilization information in the GTP extension header into the outer IP header option.

Figure 6:
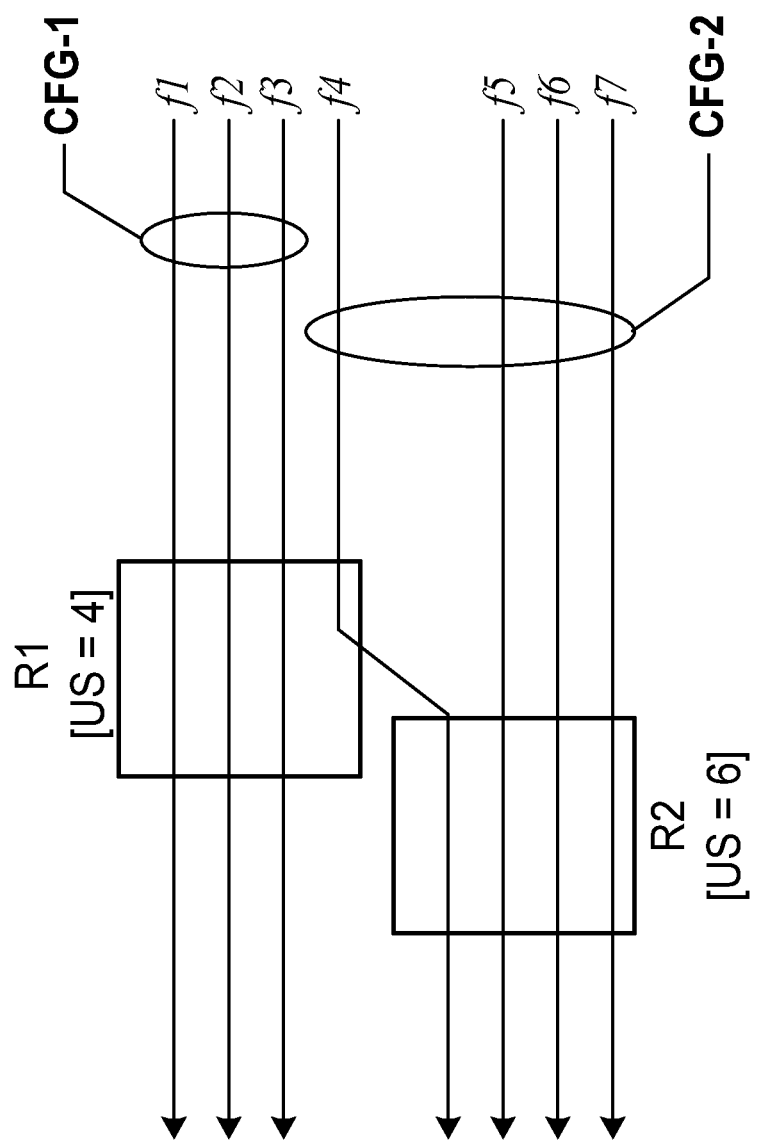
FIG. 6 shows schematically part of the steps of a method according to an embodiment of the present invention.

FIG. 6 shows schematically part of the steps of a method according to a sixth embodiment of the present invention. In FIG. 6 a grouping of flows into distinct congestion flow groups CFG is shown. The resource management entity RME upon receiving the utilization information can use it to apply suitable congestion mitigation actions while attempting to preserve the QoE expectations and ensuring optimized utilization of the node/network resources. The level of granularity offered by the congestion information enables the resource management entity RME to differentiate between flows based on the varying level of congestion being experienced by them due to a specific or set of resources in a node or set of nodes.

For instance, the resource management entity RME is able to differentiate non-congested, mildly congested, medium congested, severely congested etc flows. Hence the resource management entity RME is able to derive and apply differentiated mitigation policies/rules on target flows or group of flows in isolation of flows in other groups and/or other non-congested flows. Of course categories of congestion, in addition to the above mentioned, can also be defined depending on the operator policy and/or perception of congestion.

Based on said differentiation, the resource management entity RME can group flows that either, for example, share the same congestion level and/or congestion trend and/or the same bottleneck link into distinct non-overlapping congestion flow groups CFG. The information in the multi-tuple congestion information parameter to can be used to create different criteria for grouping flows.

In more detail FIG. 6 shows the forming of two congestion flow groups CFG-1 and CFG-2 based on utilization score US values and node identifications. Flows f1, f2, f3, . . . , f7 pass through router nodes R1 and R2 having US values of US=4 and Us=6 respectively. For FIG. 6 it is assumed that the congestion level experienced by these flows f1, f2, f3, . . . , f7 before passing through router nodes R1 and R2 are lower than the prevailing congestion levels of router nodes R1 and R2. Thus the flows f1, f2, f3, f4 get marked by router R1, while the flows f4, f5, f6, f7 get marked by router R2. Since the flow f4 passes through both router nodes R1 and R2 getting marked by them respectively, said flow f4 carries the US value of R2 because the utilization score of router R2 is greater than that of router R1: US[R2]>US[R1]. The resource management entity RME thus logically groups flows f1, f2, f3 into a first congestion flow group CFG-1 while the other flows f4, f5, f6, f7 are grouped into a different congestion flow group CFG-2. Since a congestion flow group CFG signifies flows that share the same bottleneck within the network, hence all flows within the congestion flow group CFG are expected to have the same flow congestion signature FCS and exhibiting a similar congestion trend.

Figure 7:
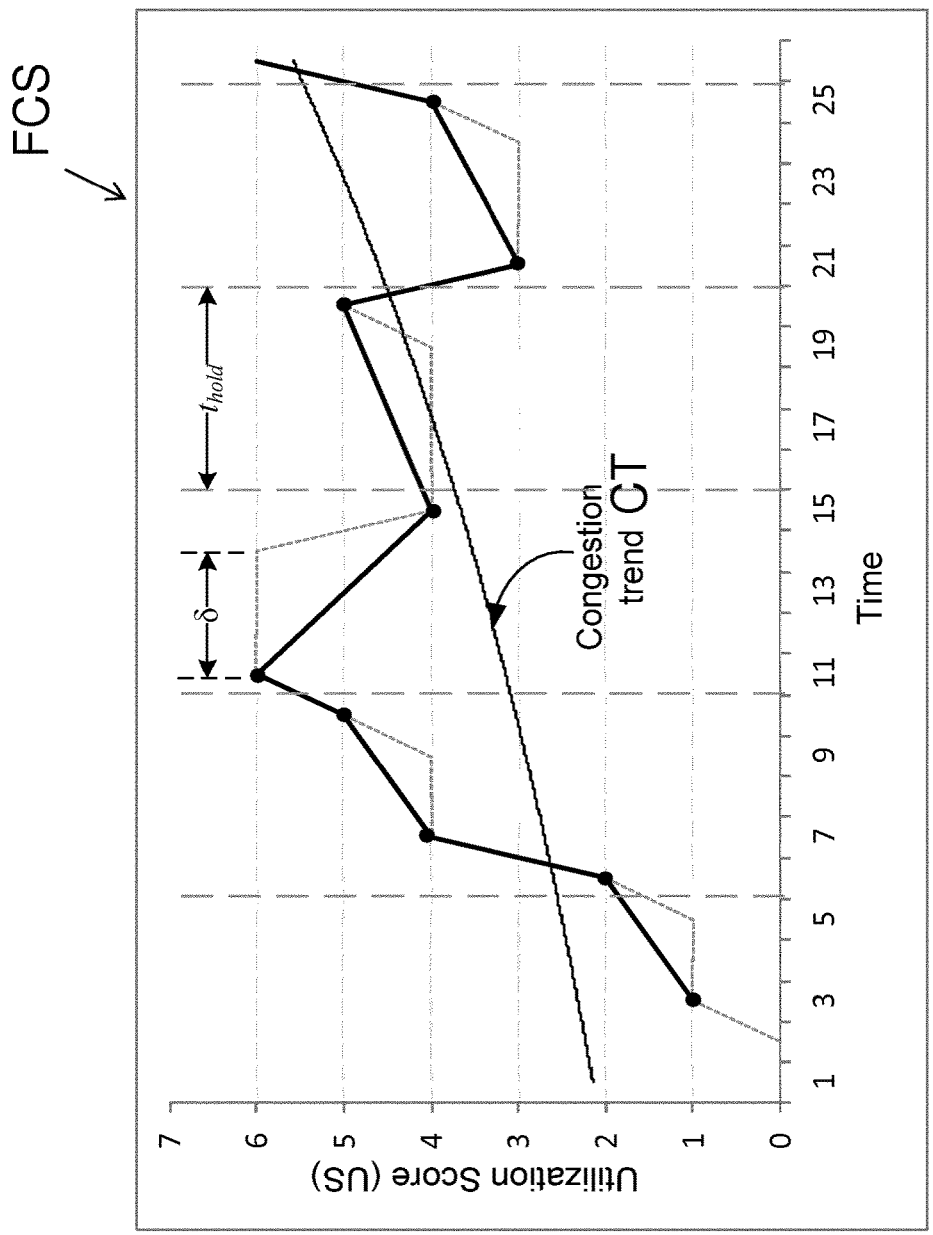
FIG. 7 shows schematically steps of a part of a method according to an embodiment of the present invention.

FIG. 7 shows part of a method according to a seventh embodiment of the present invention. In FIG. 7 a flow congestion signature FCS of a flow is shown. Such a flow congestion signature FCS can be derived by the resource management entity RME considering that it is being continuously updated with the congestion status of the network. A flow congestion signature FCS is preferably represented by a plot of utilization score US values with reference to the time at which the congestion notification arrives at the resource management entity RME. In more detail FIG. 7 shows an example of flow congestion signature for flow in downlink direction.

The flow congestion signature FCS can enable the resource management entity RME to determine the level of congestion that a flow is experiencing within the network by deriving the congestion trend by any suitable trend estimation method. Furthermore, the time difference δ between successive utilization score US values can indicate the persistence of congestion in a node/network, and hence enable the resource management entity RME to discern between transient and persistence congestion so that suitable control actions can be invoked. For example, the resource management entity RME only invokes a control strategy if the time difference δ exceeds beyond a specific threshold. The threshold can be different for different application types thereby enabling the resource management entity RME to handle flows more judiciously/flexibly based on its application type. For instance, a node with a utilization score US corresponding to a 60% utilization of an egress queue may be considered highly congested with reference to some delay sensitive application such as Voice-Over-IP, while it may not be considered congested at all for a delay tolerant application with lower quality of experience QoE requirements such as online reading of a newspaper.

It is preferably assumed that the resource management entity RME has application detection capability, or at least access to an application detection function. In order to prevent the resource management entity RME against wrong interpretations of the determined time differences δ, the flow congestion signature FCS maintains/holds the previously received utilization score US value for a specified hold time thold before dropping the graph to zero if no notification arrives during the hold period. The value of thold is dependent on the flow characteristics. For example, long-lived flows have a higher value of thold than short-lived flows.

The congestion trend, along with the knowledge of δ can enable the resource management entity RME to derive and invoke prescribed congestion mitigation methods based on some policy or rule(s). Some mitigation steps could be, but not limited to throttling down the flow data rate in order to control or alleviate the congestion in the network, by rerouting the flows through a non-congested path, or even instantiating new virtual machines to provide more resources to congested flows within a data center etc. Mitigation methods may be applied on flows within a congestion flow group CFG in isolation of other congestion flow groups CFGs and/or non-congested flows.

Figure 8:
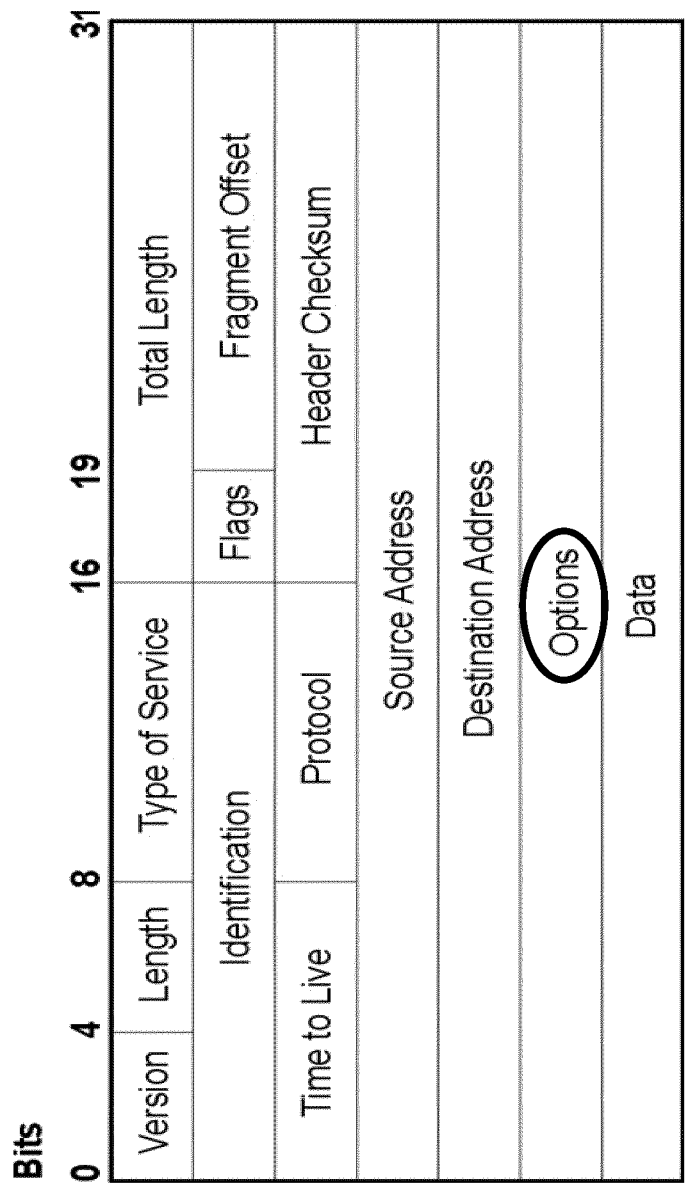
FIG. 8 shows schematically a part of a system according to an embodiment of the present invention.
Figure 9:
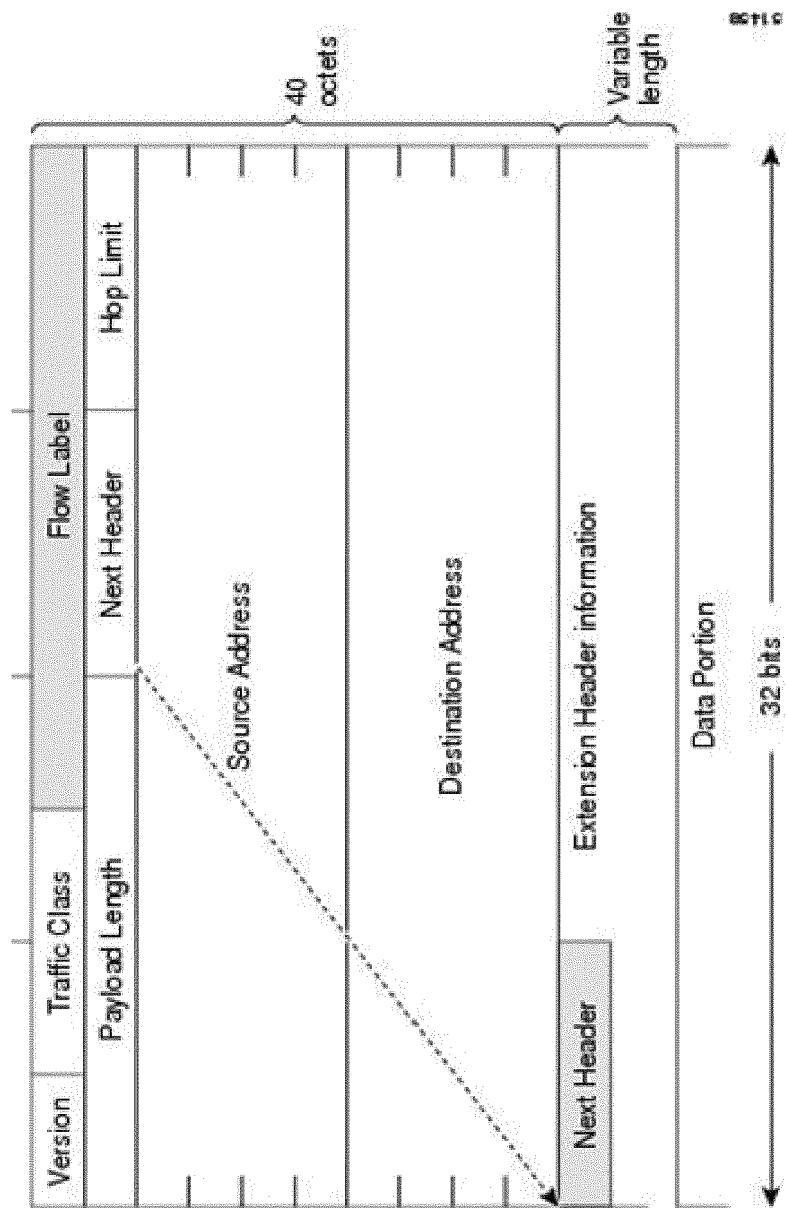
FIG. 9 shows schematically part of a system according to an embodiment of the present invention.
Figure 10:
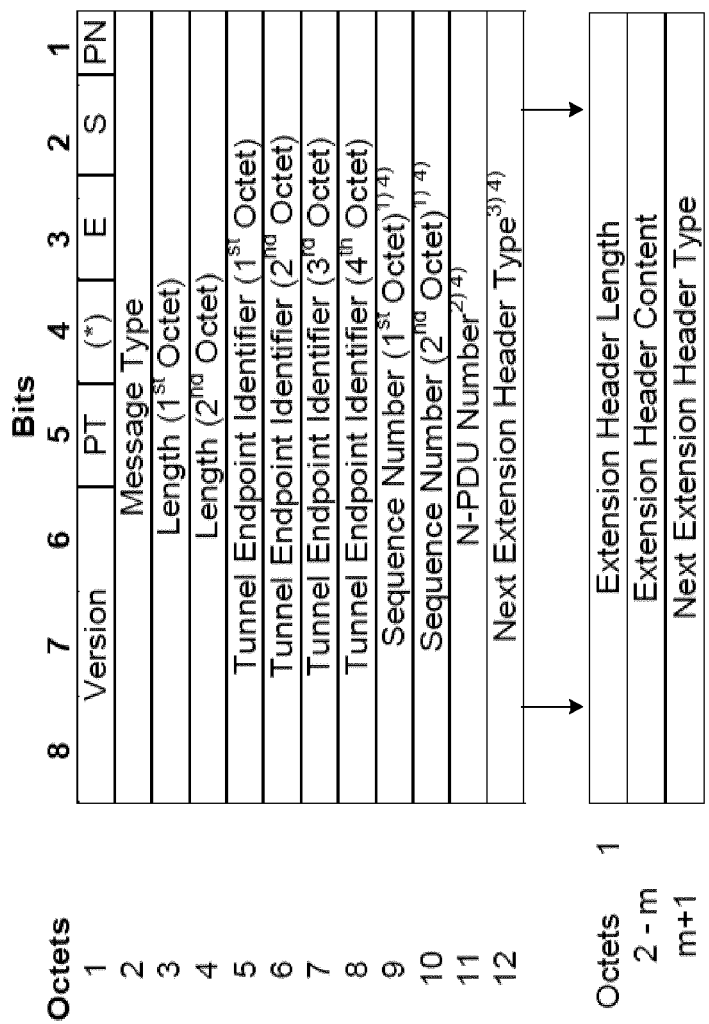
FIG. 10 shows schematically part of a system according to an embodiment of the present invention.

FIG. 8-10 shows congestion information being communicated towards a resource management entity and coded in the uplink and downlink packet headers. FIG. 8 shows schematically part of a system according to an eighth embodiment of the present invention. In FIG. 8 an IPv4 header format for incorporating "congestion information" option is shown. A new IPv4 option is defined to carry the congestion information. FIG. 8 shows the placement and access of the corresponding header option. FIG. 9 shows schematically part of a system according to ninth embodiment of the present invention. In FIG. 9 a new IPv6 extension header, for example congestion information header is defined to carry the congestion information. FIG. 10 shows schematically part of a system according to a tenth embodiment of the present invention. In FIG. 10 the GTP extension header, for example congestion information header is defined to carry the congestion information. As in the previous FIG. 8, 9, FIG. 10 shows the corresponding placement and access of the header option respectively the extension header.

To summarize the aforementioned figures they show a method and a system enabling an explicit notification of the location and state of utilization of a variety of network resources in terms of bandwidth, packet error rate, delay, computing and memory resources, etc. on a per-flow basis towards a centralized resource management entity RME instead of distributed source nodes. This resource management entity RME may be collocated or integrated with one of the networks aggregation nodes like routers, gateways or the like with interface to a control plane entity of the network. The resource management entity RME may also be part of the control plane entity having an interface with aggregation nodes.

All intermediate routing/forwarding/service nodes within a so-called congestion domain CD may notify the resource management entity RME of the absence or presence of congestion on a data path—path congestion—by explicitly indicating the highest level of congestion by means of a utilization score US or utilization level US prevailing on the flow path. Additional information such as the identification of the congestion node and the type of congested resources may be provided as well enabling the resource management RME to apply differentiated mitigation policies or rules on specific flow or flows or group of flows based on application requirements and in view of the type and status of the resource or resources. A highly utilized node on a path is preferably identified as it induces congestion in other nodes due to back pressure. The nodes may derive their utilization score US values based on the utilization of their resources. Since the network can have different types of nodes the same semantic interpretation of utilization levels of all entities in a specific domain is preferable. This can for example achieved by means of a normalizing function and the semantics for the utilizations can be specified by the operator based on policies.

Based on the utilization score US values received for each active flow a congestion signature may be derived for each flow. Flows having a similar congestion signature imply passing through the same congested node and may therefore logically grouped together into a so-called single congestion flow group CFG. Multiple congestion flow groups CFG are possible and appropriate or specific congestion mitigation policies or rules may be derived and applied on respective congestion flow groups CFG where the flows within a single congestion flow group CFG are managed with respect to one another and on merit of the service requirements without impacting flows in other congestions flow groups and/or non-congested flows.

Additional information may also be provided such as the ID of the congestion marking entity besides a utilization score US enabling the resource management entity RME to identify and group flows into congestion flow groups accurately.

The congestion mitigation policy or rule within the resource management entity RME or provided to resource management entity RME from an external control entity like the policy and charging rules function PCRF, a data center resource controller or the like at the minimum and most basic, may perform, but of course is not limited to traffic pacing, shaping, trans-coding, packet dropping, flow re-routing, virtual resource instantiation and provisioning or the like to counteract congestion due to an over-utilization of specific resources within the network and/or some cloud entity such as a data center or the like.

To summarize a calculation of the utilization score US is derived from different utilization metrics, which preferably provides a scalar value expressing the level of utilization of the various resource along a flow's path, and which is then passed along the data path through the network. Further an identification of a path bottleneck in a network domain, for example a mobile network, a data center, etc., including the cause and the location of resource bottlenecks is enabled by providing a rich set of information such as the utilization score, ID of the congested node, the type of the resource, e.g. cpu, memory, queue, etc. Even further a formation/identification of congestion flow groups CFG by grouping of flows which, for example, share the same bottleneck, and application of dynamic, differentiated and context-aware control policies on a per-flow basis within each congestion flow group CFG is enabled.

Embodiments of the present invention enables conveying of resource utilization information to a central management entity by notification of the highest resource utilization level prevailing on a data path in the network, preferably by calculating one or more scalar utilization scores based on the utilization of the resources, by marking of packets with the utilization score values and preferably additional information allowing for identifying a bottleneck node for a particular resource type wherein the packets only get marked if the utilization score value exceeds the utilization score value experienced by the packet thus far. The marking node overwrites the utilization information of some other node.

Even further, embodiments of the present invention provides a central management entity using the utilization information to create groups of flows sharing the same path and/or the same physical bottleneck. Embodiments of the present invention enable the central management entity to perform either path-switching/re-routing of traffic flows or adding of further resources for example computational resources, virtual network functions, etc. to resolve congestion based on the type of resource which is over-utilized.

Embodiments of the present invention enable an effective management of user plane congestion at traffic aggregation points and ensures that the flows satisfy user expected quality of experiences. Further, embodiments of the present invention enables the operators to be able to define sophisticated congestion mitigation rules or policies and their application. Embodiments of the present invention enable virtual and/or real nodes in a congestion domain to derive congestion scores or utilization scores respectively based on the respective nodes resources utilization. Further, embodiments of the present invention enables the nodes to mark the uplink and/or downlink packets with a utilization score prevalent at the time of transmitting a packet. Even further, embodiments of the present invention enables only nodes with the highest utilization score with respect to other nodes on a flow path to mark a packet. Further packets get marked by a multi-triple congestion information parameter that may include congestion related information other than utilization scores and congestion location.

Embodiments of the present invention even further enable a resource management entity to group flows into distinct congestion flow groups CFG based on the utilization scores. The resource management entity RME is preferably provided with an interface with a C-plane entity of the congestion domain for having access to user/network/service/application context data and for deriving mitigation policies and rules.

Inter alia, embodiments of the present invention may provide the following advantages: the present invention enables exposure of the location of resource bottlenecks and the identification of flows sharing the bottleneck along a common path. Embodiments of the present invention enable resource management in a coordinated manner by a centralized management entity based on the aforementioned path utilization information. Another advantage of embodiments of the invention is, that instead of re-locating or out-scaling of resources the path of traffic flows can be changed such that a congestion which may be either based on network or computational resources—is avoided and therefore overall fewer resources are required. A further advantage of embodiments of the invention is that utilization monitoring is done along user plane traffic path such that an expensive and explicit calculation of traffic flows to traffic path and not information can be avoided. Even further, embodiments of the present invention enable a fast reaction on the changing traffic and/or computational requirements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing flows in a network with a plurality of forwarding elements routing the flows between network entities of a network or network domain, the method comprising:
   a) marking flows between network entities with congestion information by at least one of the forwarding elements such that the highest congestion level prevailing on the respective flow path is indicated;
   b) identifying locations of one or more possible and/or present bottlenecks and/or congestions in the network based on the congestion information; and
   c) performing one or more actions to avoid, mitigate, and/or resolve the identified possible and/or present bottlenecks and/or congestions, wherein:
   based on congestion information for each flow, flows having a similar congestion information are logically grouped together to a congestion flow group, and
   the one or more actions according to step c) are determined and performed for each congestion flow group individually.

2. The method according to claim 1, wherein the congestion information includes resource utilization information of a network entity via which, to, or from a flow is transported.

3. The method according to claim 2, wherein a resource use level of resources and/or performance parameters of a forwarding element are included into the resource utilization information.

4. The method according to claim 3, wherein a resource of a forwarding element is provided in form of memory, central processing units and/or link bandwidths and/or performance of a forwarding element is represented by packet waiting time, packet drop ratio, central processing unit load, hypervisor switching time and/or link utilization.

5. The method according to claim 3, wherein for a flow one or more utilization levels are determined for different resource types.

6. The method according to claim 3, wherein the congestion information is provided in form of values of the one or more determined utilization levels.

7. The method according to claim 1, wherein steps b) and c) are performed by a central management entity in a network domain.

8. The method according to claim 7, wherein the central management entity is co-located or integrated with an aggregation node of the network.

9. The method according to claim 1, wherein based on congestion information for each flow a corresponding flow congestion signature is determined and flows having a similar flow congestion signature are logically grouped together to a congestion flow group.

10. The method according to claim 9, wherein a congestion trend based on the congestion information with regard to the congestion level over time is included into the flow congestion signature.

11. The method according to claim 10, wherein a persistence of congestion is determined for the flow congestion signature based on a time difference between successive congestion information.

12. The method according to claim 10, wherein one or more actions to at least mitigate the bottlenecks and/or congestions are performed only if a time difference and/or a congestion trend exceeds a predetermined threshold.

13. The method according to claim 1, wherein the congestion level is indicated by one or more congestion scores.

14. The method according to claim 13, wherein the one or more congestion scores are provided in form of single scalar quantity.

15. The method of claim 13, wherein the one or more congestion scores are in the form of one or more utilization scores.

16. The method according to claim 1, further comprising marking the flows in step a) with additional information related to the properties of the respective forwarding elements.

17. The method of claim 16, wherein the additional information related to the properties of the respective forwarding elements is identity and/or type and/or status of the respective forwarding elements and/or respective resource elements.

18. The method according to claim 1, wherein congestion levels of different resources in the same or different forwarding elements are normalized for comparison.

19. The method according to claim 1, wherein the one or more actions are determined and performed based on application requirements and/or type and/or status of resources of one or more of the forwarding elements.

20. The method according to claim 1, wherein only flows within one or more predetermined congestion domains represented by one or more of the forwarding elements are included when performing steps a)-c).

21. The method according to claim 1, wherein traffic pacing, shaping, trans-coding, packet dropping, flow re-rerouting and/or virtual resource instantiation and provisioning is performed as the one or more actions.

22. The method according to claim 1, wherein the marking of a flow is performed by sending explicit messages or by piggy-backing the information over user-plane packets of the flow.

23. The method according to claim 1, wherein upon receiving a packet of a flow by a forwarding element, the forwarding element checks whether the received packet has already been marked and
   d) if the received packet has already been marked, the forwarding element compares the congestion information with its present congestion level or score and sets the congestion information corresponding to the present congestion level or score if its present congestion level corresponds to a higher congestion level, otherwise congestion information is not altered and
   e) if the received packet has not already been marked, the forwarding element sets the congestion information corresponding to the present congestion level or score of the forwarding element.

24. The method according to claim 1, wherein the marking of flows is performed in uplink direction and in downlink direction.

25. The method according to claim 1, wherein an intermediate entity within the path of a flow checks receiving congestion information of corresponding flows and updates the congestion information in uplink direction if the congestion information in downlink direction indicates a higher congestion level than the congestion information in the uplink direction.

26. The method according to claim 1, wherein previously received congestion information is temporarily stored for a hold time.

27. The method according to claim 1, wherein the congestion information is communicated as a new IPv4 option, a new IPv6 extension header, and/or a new GTP extension header.

28. The method of claim 1, wherein the congestion information is in the form of resource utilization information.

29. A method for managing flows in a network with a plurality of forwarding elements routing the flows between network entities of a network or network domain, the method comprising:
   a) marking flows between network entities with congestion information by at least one of the forwarding elements such that the highest congestion level prevailing on the respective flow path is indicated;
   b) identifying locations of one or more possible and/or present bottlenecks and/or congestions in the network based on the congestion information; and
   c) performing one or more actions to avoid, mitigate, and/or resolve the identified possible and/or present bottlenecks and/or congestions,
   wherein for providing the congestion information in an uplink path and in a downlink path, the congestion information in the downlink path is copied to packets in the uplink path.

30. A system for managing flows in a network with a plurality of forwarding elements routing flows between network entities of a network or network domain, the system comprising:
   at least one forwarding element operable to mark flows between network entities with congestion information by at least one of the forwarding elements such that the highest congestion level prevailing on the respective flow path is indicated; and
   an identifier operable to identify the locations of one or more possible and/or present bottlenecks and/or congestions in the network based on the congestion information; and
   an executor operable to execute one or more actions to avoid, mitigate, and/or to resolve the identified possible and/or present bottlenecks and/or congestions, the one or more actions being determined and performed individually for each congestion flow group that corresponds to flows having a similar congestion information.

* * * * *